United States Patent [19]

Zane et al.

[11] Patent Number: 5,076,526
[45] Date of Patent: Dec. 31, 1991

[54] FASTENER FOR BICYCLE ACCESSORIES

[75] Inventors: Michael S. Zane, Brookline; Peter L. Zane, Hingham, both of Mass.

[73] Assignee: Kryptonite Corporation, Canton, Mass.

[21] Appl. No.: 490,731

[22] Filed: Mar. 7, 1990

[51] Int. Cl.⁵ ............................................. A47F 5/00
[52] U.S. Cl. .................................... 248/314; 24/339; 24/545; 224/39; 248/541
[58] Field of Search .................... 248/314, 316.2, 229, 248/541, 316.1, 309, 225.31, 540, 539, 230; 224/39, 30 R; 70/233; 24/339, 545

[56] References Cited

U.S. PATENT DOCUMENTS

| | | |
|---|---|---|
| 765,213 | 7/1904 | Thompson . |
| 795,782 | 7/1905 | Porter . |
| 1,402,725 | 1/1922 | Pippen . |
| 1,629,859 | 5/1927 | Burke . |
| 2,686,029 | 8/1954 | Raymond ........................ 248/229 X |
| 2,916,237 | 12/1959 | Bertling et al. . |
| 3,581,354 | 6/1971 | Usiskin ............................ 248/229 X |
| 3,591,211 | 7/1971 | Richey ............................ 248/229 X |
| 3,747,166 | 7/1973 | Eross . |
| 3,848,783 | 11/1974 | Falk . |
| 3,924,426 | 12/1975 | Zane et al. . |
| 3,967,475 | 7/1976 | Zane . |
| 4,155,231 | 5/1979 | Zane et al. . |
| 4,176,770 | 12/1979 | Griggs et al. . |
| 4,436,232 | 3/1984 | Zane et al. ........................... 224/39 |
| 4,545,224 | 10/1985 | Zane .................................... 70/39 |
| 4,730,470 | 3/1988 | Zane et al. ........................... 70/238 |
| 4,736,921 | 4/1988 | Zane et al. ....................... 248/316.2 |

FOREIGN PATENT DOCUMENTS

| | | |
|---|---|---|
| 2818943 | 11/1978 | Fed. Rep. of Germany . |
| 3008984 | 9/1981 | Fed. Rep. of Germany . |
| 2441079 | 11/1978 | France . |
| 11325 | of 1897 | United Kingdom . |
| 555662 | 9/1943 | United Kingdom . |

Primary Examiner—Ramon O. Ramirez
Attorney, Agent, or Firm—Morse, Altman, Dacey & Benson

[57] ABSTRACT

An improved fastener for releasably securing bicycle accessories to a bicycle frame is disclosed. The fastener is formed with an integral body of a hard resilient polymer including a pair of opposed retainer portions and a medial portion therebetween. One retainer portion has an opening defined by a flexible pair of jaws with inner surfaces presenting a curved seat for snugly receiving a part of a bicycle frame ranging in diameter from one to about 1½ inches. The medial portion acts as a buffer for mechanically and flexibly isolating the pair of retainer portions from each other and features a cusped opening. The other retainer portion is formed with a cross sectional opening including circular, rectangular, oval, crescent-shaped, pentagonal, hexagonal and octogonal. The pair of jaws are secured to the bicycle part by either a bent bolt, a straight bolt or a sex bolt.

30 Claims, 7 Drawing Sheets

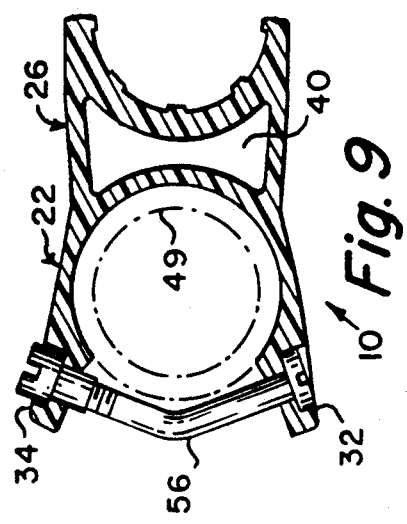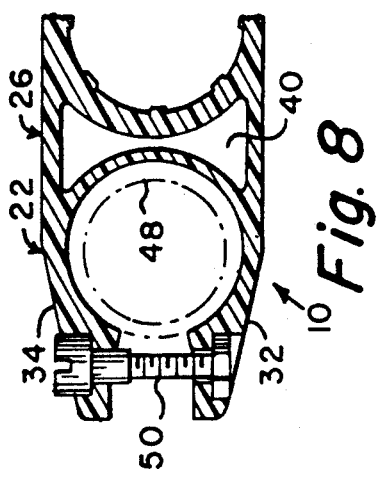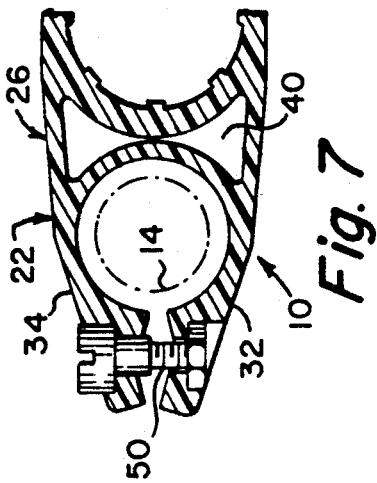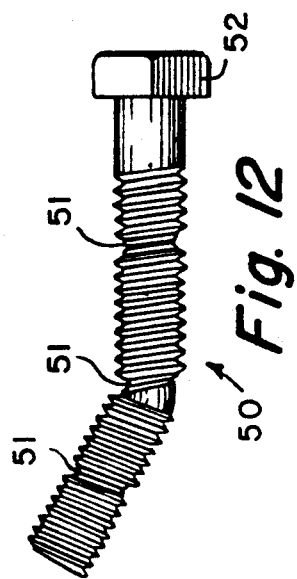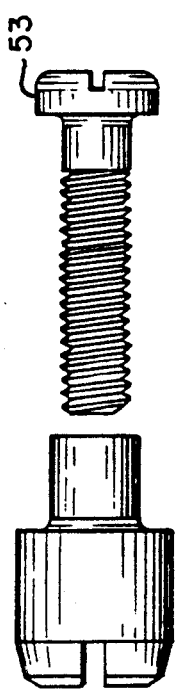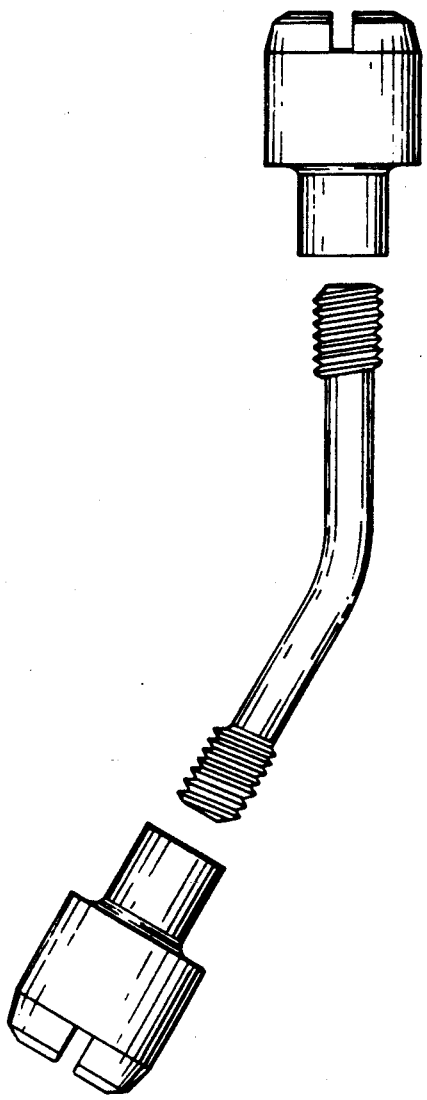

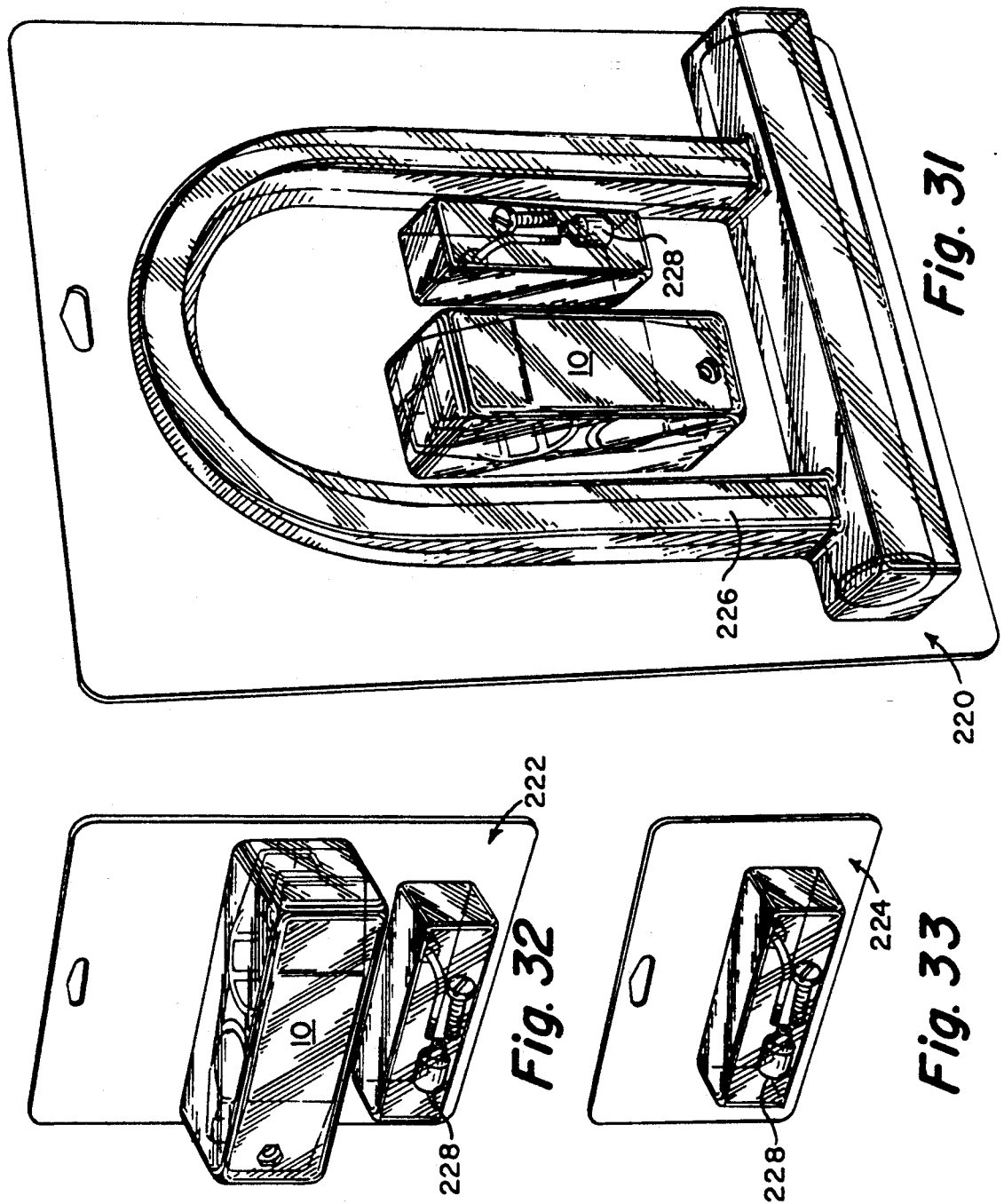

FASTENER FOR BICYCLE ACCESSORIES

BACKGROUND OF THE INVENTION

1. Field of the Invention

The present invention relates generally to mounting means for bicycle accessories and, more particularly, to an improved fastener for releasably securing bicycle accessories, such as locks and water bottles, to a bicycle frame.

2. The Prior Art

The first known cycle lock patented in the U.S.A. is believed to have issued to Howard L. Pippen, see U.S. Pat. No. 1,402,725. Mounting means for bicycle accessories, including locks, have been patented over the years. See U.S. Pat. Nos. 1,629,859; 3,848,783; 3,924,426; and 3,967,475. In the mid 1970's, a bicycle lock and bracket comprising a U-shaped shackle and a cross piece were developed, see U.S. Pat. No. 4,155,231. A bracket for securing such a lock to a motorcycle is disclosed in U.S. Pat. No. 4,436,232. A bracket for mounting a pipe mast is shown in U.S. Pat. No. 2,916,237; while a holder for flexible tubing is disclosed in U.S. Pat. No. 3,747,166. Mounting a canteen astride a motorcycle handlebar is shown in U.S. Pat. No. 4,176,770. Mounting an umbrella to a pipe is disclosed in British Patent No. 11,325, granted in 1897. Mounting of a cycle pump to a bicycle is shown in British Patent No. 555,662; and a two-way clip securing a ticket to a round bar is disclosed in French Patent No. 2,441,079.

A set of contoured clamps for bicycle locks, some featuring a winged nut, made of sheet metal, was disclosed in an application Ser. No. 467,609 filed Feb. 18, 1983 by the applicants herein, entitled "Mounting Bracket for Bicycle Lock." Application Ser. No. 467,609 was, in part, abandoned since the product intended to be protected thereby had been rendered obsolete by a product now protected by U.S. Pat. No. 4,736,921, "Clamp for Holding Bicycle Lock," granted Apr. 12, 1988. The clamp of U.S. Pat. No. 4,736,921 is made of a hard resilient plastic material, as opposed to being formed of sheet metal. The present application is intended to protect an improved and more versatile version of a plastic fastener for releasably securing bicycle accessories to a bicycle frame.

SUMMARY OF THE INVENTION

It is a principal object of the present invention to overcome the above disadvantages by providing an improved fastener for releasably securing bicycle accessories to a bicycle frame.

More specifically, it is an object of the present invention to provide a fastener for releasably securing a bicycle accessory, such as a lock, a water bottle or the like to a bicycle frame comprising an integral body composed of a hard resilient polymer and including a pair of opposed retainer portions and a medial portion therebetween and extending along a longitudinal axis, one of the retainer portions having an opening defined by a pair of jaws with inner surfaces developed by a paraxial locus of linear increments about a first transverse axis, the medial portion having an opening with inner surfaces developed by a paraxial locus of linear increments about a second transverse axis, with the first and second transverse axes being parallel to each other and normal to the longitudinal axis. The paraxial locus of the one retainer portion presenting a curved seat for snugly receiving part of a bicycle frame; with the paraxial locus of the opening in the medial portion providing a buffer for mechanically and flexibly isolating the configurations of the pair of retainer portions from each other. The cross sectional configurations of the opening of the medial portion and of the opening presenting the curved seat in a plane along the longitudinal axis being such that the medial portion's opening is cusped and defined by a curve which lies along the curve defining the curved seat and by a pair of parallel lines which are paraxial to the longitudinal axis.

Other objects of the present invention will in part be obvious and will in part appear hereinafter.

The invention accordingly comprises the fastener for releasably mounting a bicycle accessory to a bicycle frame of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 7 is a fragmentary sectional view along the line 7—7 of FIG. 1;

FIGS. 8 and 9 are views similar to FIG. 7 but showing the same fastener mounted to larger diameter posts of a bicycle frame;

FIGS. 10-18 illustrate various embodiments of bolts designed to secure the fastener of the invention to bicycle posts of different sizes;

FIGS. 31-31 illustrate blister packages for displaying and selling the products of the invention.

DETAILED DESCRIPTION OF THE PREFERRED EMBODIMENTS

Figure 1:
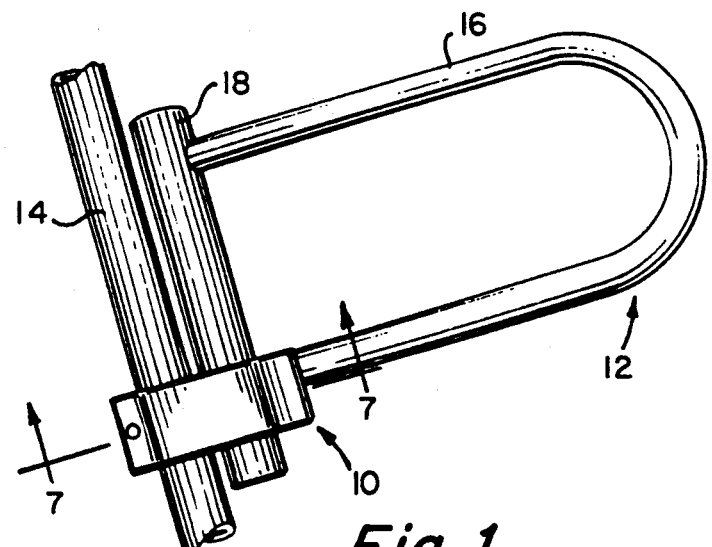
FIG. 1 is a perspective view of a fastener constructed in accordance with the present invention and shown releasably securing a lock to an upright post of a bicycle frame.

The Embodiment of FIGS. 1, 2, 4, 7, 8 and 9

In general, one preferred embodiment of a fastener 10 for releasably securing a bicycle lock 12 to an upright post 14 of a bicycle frame is illustrated in FIGS. 1, 2, 4, 7, 8 and 9. The bicycle lock 12 is comprised of a U-shaped shackle 16 and a cross bar 18 connected across the open end of the shackle 16. Fastener 10 is an improvement over the bicycle clamp disclosed and claimed in our previous U.S. Pat. No. 4,736,921 granted Apr. 12, 1988 and assigned to KBL Corporation, which is a predecessor in name of the within assignee, the KRYPTONITE Corporation.

Figure 2:
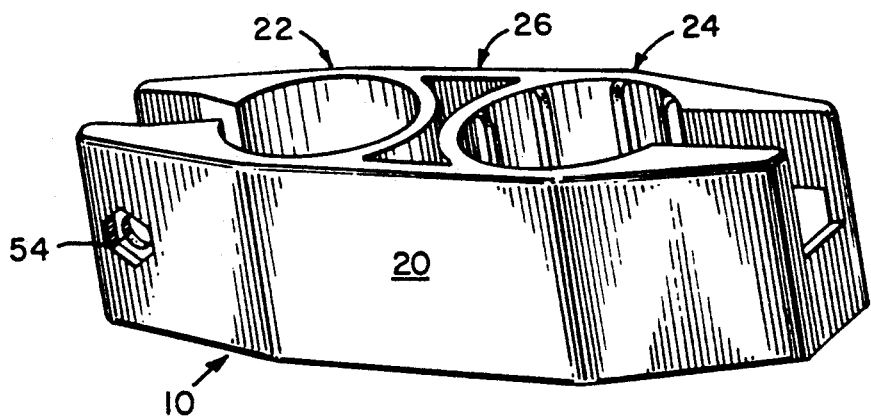
FIG. 2 is an enlarged perspective of the fastener shown in FIG. 1.

An enlarged perspective view of the fastener 10 is illustrated in FIG. 2. The fastener 10 is formed as an integral body 20 of a hard, resilient plastic material, such as a linear polyamide, including nylon, in a suitable mold and preferably by injection molding. The integral body 20 includes a pair of opposed retainer portions 22 and 24 and a medial portion 26 therebetween. The retainer portions 22 and 24 and the medial portion 26 extend along a longitudinal axis 28, observe FIG. 4. Retainer portion 22 has an opening 30 defined by a pair of jaws 32, 34, with inner surfaces 36 developed by a paraxial locus of linear increments about a first transverse axis 38. Medial portion 26 has an opening 40 with one inner surface 42 developed by a paraxial locus of linear increments about a second transverse axis 44. Another inner surface 46 is developed by a paraxial locus of linear increments about the first transverse axis 38. The first transverse axis 38 and the second transverse axis 44 are parallel to each other and both are normal to the longitudinal axis 28. The paraxial locus of the retainer portion 22 presents a curved seat for snugly receiving the post 14 of a bicycle frame, the curved seat having a curved cross section, note FIG. 7. Preferably, the post 14 is formed with a diameter of one inch. The pair of jaws 32, 34 of the retainer portion 22 are flexible so as to make the opening 30 adaptable for snugly receiving a post 48, observe FIG. 8, of a bicycle frame, not shown, whose diameter is greater than that of post 14. Preferably, the post 48 is formed with a diameter of 1¼ inches. The pair of jaws 32, 34 are in fact so flexible as to make the opening 30 defined thereby adaptable for singly receiving a post 49 whose diameter is 1½ inches, observe FIG. 9.

The paraxial loci of the surfaces 42 and 46 of the opening 40 in the medial portion 26 provide a buffer for mechanically and flexibly isolating the configurations of the pair of opposed retainer portions 22 and 24 from each other. The cross sectional configurations of the opening 40 in the medial portion 26 and the opening 30 of the retainer portion 22 in a plane along the longitudinal axis 28 and normal to the transverse axes 38 and 44 are such that the opening 40 is cusped and defined by a curve which is defined by the other inner surface 46, which curve is spaced from and lies along the curve of the curved seat defined by the inner surface 36. On its sides, the opening 40 is bounded by lines 41 and 43 which are paraxial to the longitudinal axis 28. Preferably, the retainer portion 24 is provided with a plurality of axial ridges 25 which are beveled at least at their upper ends.

The pair of jaws 32 and 34 are used to secure the fastener 10 to the post 14 of the bicycle by a bolt 50, which is a straight bolt or a sex bolt. Bolt 50, preferably formed with a hexagonal head 52 to fit into a hexagonal opening 54, also can be formed as a break-away bolt illustrated in FIG. 12, with four segments separated by three break-away sections 51. The bolt also can be formed with a round head 53, in which case two screw drivers are needed to tighten the bolt, observe FIG. 10. A straight bolt or a sex bolt can still be used with the 1¼" post 48. However, with the jaws 32 and 34 really flexed apart to accommodate the post 49 with the 1½" diameter, an oversized bolt 56, such as a bent bolt, is required.

Figure 14:
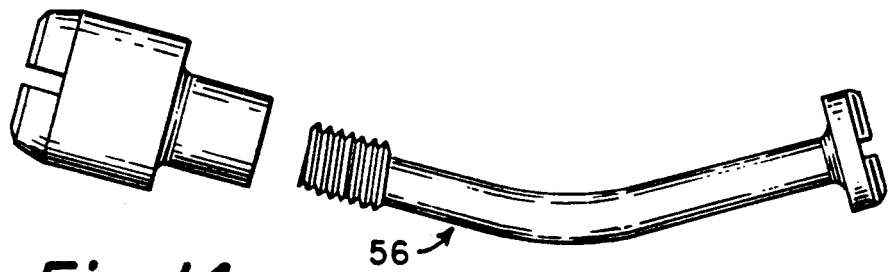
Figure 15:
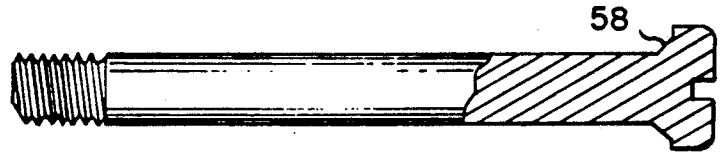
Figure 16:
Figure 17:
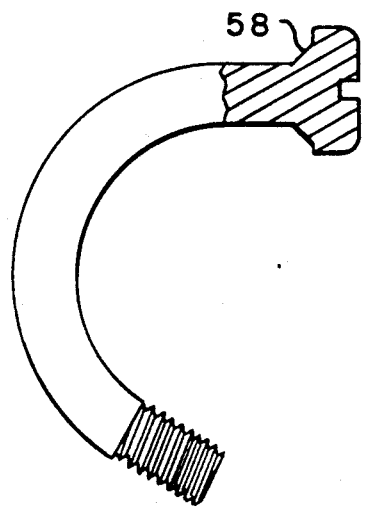
Figure 18:
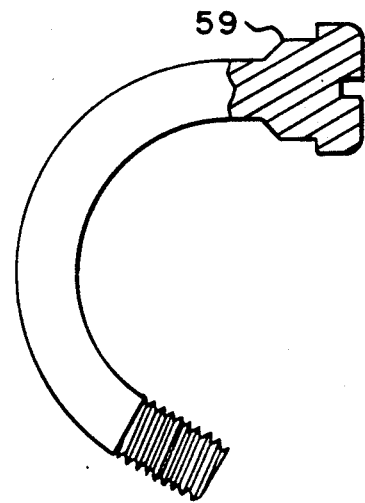

Bent bolt 56 can be formed of two pieces, as illustrated on an enlarged scale in FIG. 14, or it can comprise three pieces, as illustrated in FIG. 11. When tightening the two-piece version, only one screwdriver is needed since the fact that the screw is bent prevents the same for turning. The two-piece straight bolts illustrated in FIGS. 10 and 13 differ one from the other in length and that the longer version's bolt is smooth for most of its axial length. This smoothness is desired lest the bolt scratches the post of the bicycle, adversely affecting its appearance. The same considerations apply when the bolt is bent, see bolt 56, FIGS. 9 and 14. In all other respects, the bolts illustrated in FIGS. 10-14 are regular bolts, with each being used, if desired, with one or more appropriately sized washer, not shown. In order to facilitate the centering of the bolts upon insertion into a circular opening of the fastener 10, the bolts illustrated in FIGS. 15 and 17 are both formed with a chamfer 58. For some applications, a bolt formed with a combination step and chamfer 59 may be preferably, note FIGS. 16 and 18.

Figure 3:
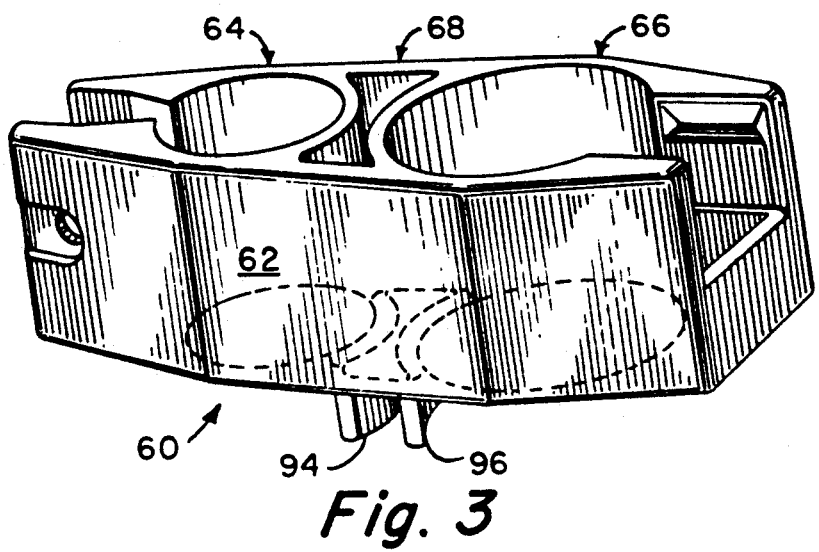
FIG. 3 is a view similar to FIG. 2 but showing a different embodiment thereof.
Figure 4:
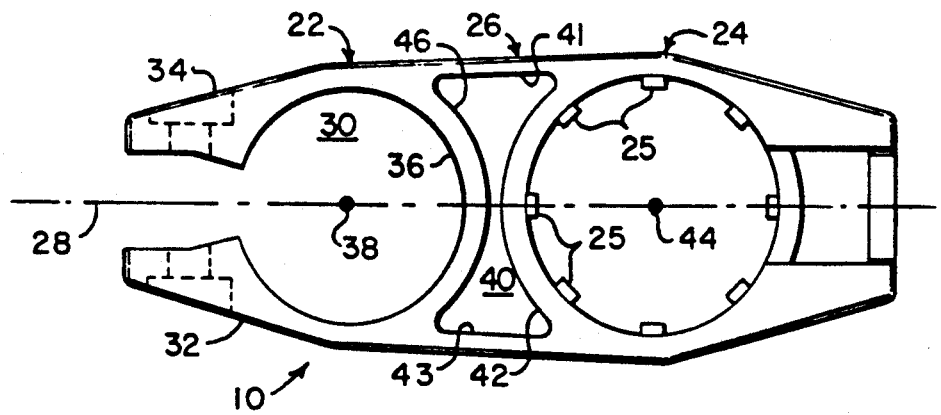
FIG. 4 is a plan view of the fastener shown in FIG. 2.
Figure 5:
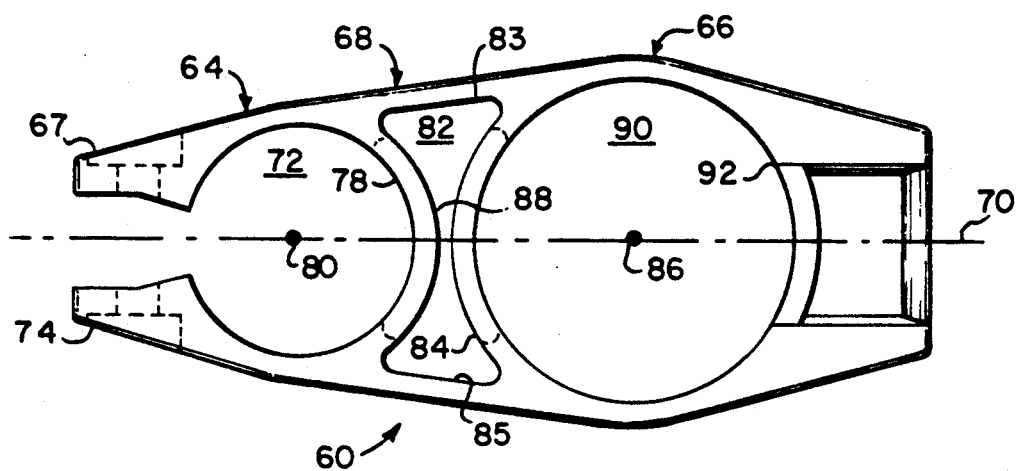
FIG. 5 is a plan view of the fastener shown in FIG. 3.
Figure 6:
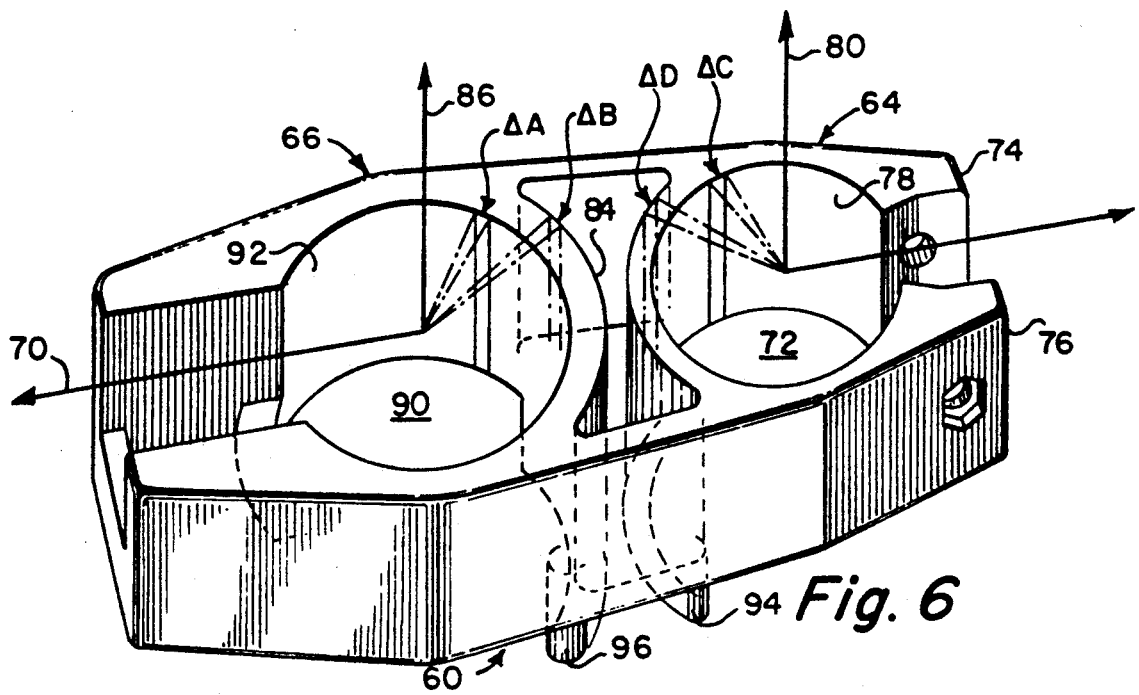
FIG. 6 is a perspective view of the fastener shown in FIG. 3, illustrating its geometry about a longitudinal axis and two transverse axes parallel to one another and normal to the longitudinal axis.
Figure 13:
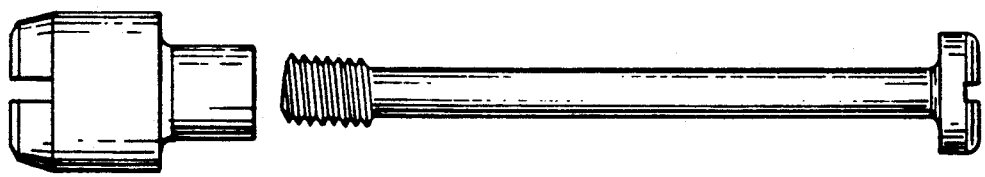

The Embodiment of FIGS. 3, 5 and 6

A second preferred embodiment of a fastener 60 for releasably securing the bicycle lock 12 to the upright posts 14, 48 or 49 is illustrated in FIGS. 3, 5 and 6. Fastener 60 essentially differs from the fastener 10 in being sturdier, hence heavier, in construction to accommodate heavier locks 12.

Fastener 60 also is formed as an integral body 62 of a hard, resilient plastic material, such as a linear polyamide, including nylon, in a suitable mold and preferably by injection molding. Integral body 62 also includes a pair of opposed retainer portions 64 and 66 and a medial portion 68 therebetween. The retainer portions 64 and 66 and the medial portion 68 extend along a longitudinal axis 70, note FIGS. 5 and 6. Retainer portion 64 has an opening 72 defined by a pair of jaws 74 and 76, with inner surfaces 78 developed by a paraxial locus of linear increments $\Delta C$ about a first transverse axis 80. Medial portion 68 has an opening 82 with our inner surface 84 developed by a paraxial locus of linear increments $\Delta B$ about a second transverse axis 86. Another inner surface 88 is developed by a paraxial locus of linear increments $\Delta D$ about the first transverse axis 80. Retainer portion 66 also has an opening 90 with inner surfaces 92 developed by a paraxial locus of linear increments $\Delta A$ about the second transverse axis 86. Opening 90 is larger than the opening 72. Transverse axes 80 and 86 are parallel to each other and both are normal to the longitudinal axis 70. The paraxial locus $\Delta C$ of the retainer portion 64 also presents a curved seat for snugly receiving any one of the posts 14, 48 and 49 of a bicycle frame, with the curved seat having a curved cross section. The pair of jaws 74 and 76 also are flexible so as to make the opening 72 adaptable for snugly receiving one of the posts 14, 48 and 49, ranging in diameters from one inch to 1½ inches.

The paraxial loci of the surfaces 84 and 88, $\Delta B$ and $\Delta D$ respectively, of the opening 82 in the medial portion 68 provide a buffer for mechanically and flexibly isolating the configurations of the pair of opposed retainer portions 64 and 66 from each other. The cross sectional configurations of the opening 82 in the medial portion 68 and of the opening 72 of the retainer portion 64 in a plane along the longitudinal axis 70 and normal to the transverse axes 80 and 86 are such that the opening 82 is cusped and defined by a curve which is defined by the second inner surface 88, which curve is spaced from and lies along the curve of the curved seat defined by the inner surface 78. On its sides, the opening 82 is bounded by lines 83 and 85 which are not parallel but rather convergent to the longitudinal axis 70 in the direction of the jaws 74, 76. Further, the retainer portion 66 features a smooth inner surface 92. If desired, the inner surface 92 also can be provided with a plurality of ridges, just like the ridges 25 of the retainer portion 24. Still further, the fastener 60, unlike the fastener 10, is provided with a pair of stabilizing extensions 94 and 96. These stabilizing extensions 94 and 96 are intended firstly, to give added strength to the fastener 60 in the medial portion 68 thereof, and, secondly, to give added stability to the fastener 60, when mounted to the post 14, against vertical tilting when a heavy bicycle lock is inserted therein.

The Embodiments of FIGS. 19, 21-24

The embodiments of a fastener according to the invention and illustrated in FIGS. 19 and 21-24 have been developed to secure bicycle locks that have configurations other than circular. In all other respects, the fasteners illustrated therein are just the like the fasteners 10 or 60 shown and described above.

Figure 19:
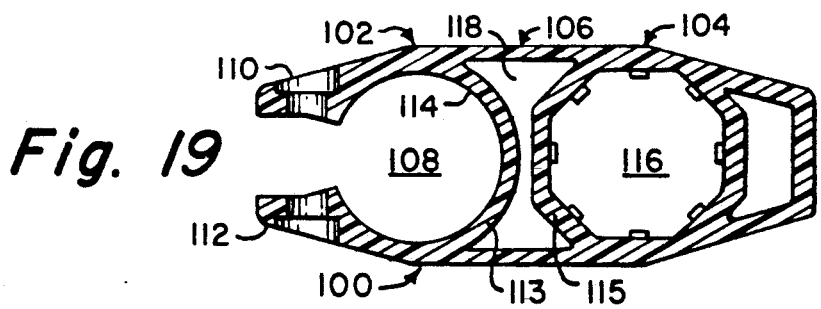
FIGS. 19-25 and 29-30, in horizontal cross section, further of a fastener constructed in accordance present invention.

Specifically, in FIG. 19 is illustrated a fastener 100 formed with an integral body of hard, resilient plastic material that includes a pair of opposed retainer portions 102 and 104 and a medial portion 106 therebetween. Retainer portion 102 has an opening 108 defined by a pair of jaws 110 and 112 with inner surfaces 114 developed by a paraxial locus of linear increments about a first transverse axis, just like retainer portions 22 or 64 above. In FIGS. 21-24, this first retainer portion, with its opening defined by the pair of jaws, has been omitted for sake of brevity, it being understood that they also are flexible so as to accommodate bicycle posts of sizes ranging form one inch to 1½ inches.

The fastener 100 differs from the fasteners 10 and 60 in that the retainer portion 104 has an opening 116 with a cross sectional configuration which is octogonal to accommodate octogonal shaped locks or accessories. The medial portion 106 features an opening 118 that is cusped, with one inner surface 113 being circular about the axis of opening 108, but a second inner surface 115 which is not circular about the axis of the opening 116. This second surface 115 preferably follows the shape of the opening 116. If desired, the second surface 115 also can be formed circular about the axis of the opening 116.

The fasteners illustrated in fragmentary section in FIGS. 21-24, respectively illustrate second retainer portions 120, 122, 124 and 126 whose internal cross sectional configuration is square, oval, pentagonal and hexagonal, respectively. Again, the respective medial portions of these fasteners are cusped, with a first circular surface about the first transverse axis of the corresponding first retainer portion. The second surface of the cusped interior of the medial portion preferably and for the most part follows the configuration of the second retainer portion. This second surface of the cusped interior however, also can be circular if desired, observe FIG. 22.

Figure 20A:
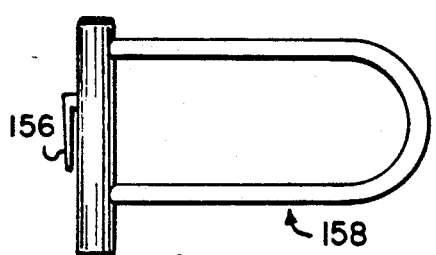
FIG. 20A is a plan view of a bicycle lock provided with a member for use with the fastener illustrated in FIG. 20.
Figure 20:
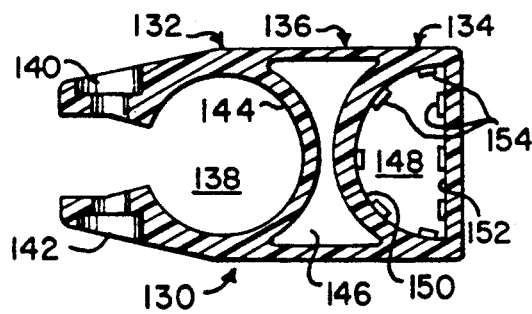
Figure 21:
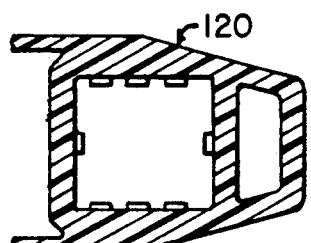
Figure 22:
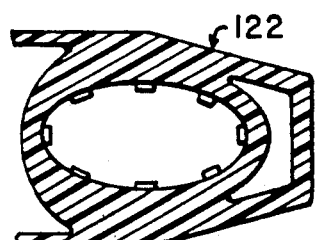
Figure 23:
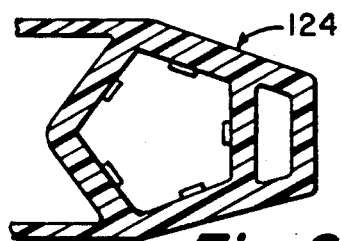
Figure 24:
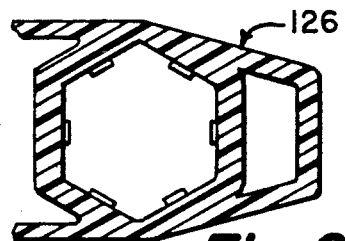

In FIG. 20, there is illustrated another embodiment of a fastener 130 according to the invention and formed with an integral body of hard, resilient plastic material that includes a pair of opposed retainer portions 132 and 134 and a medial portion 136 therebetween. Retainer portion 132 also has an opening 138 defined by a pair of jaws 140, 142, with inner surfaces 144 developed by a paraxial locus of linear increments about a first transverse axis, just like in the fastener 10 and 60. The medial portion 136 also has an opening 146 which is cusped and formed just as opening 40 of the fastener 10, note FIG. 4. The second retainer portion 134 is, however, unlike those above described and instead is formed with an opening 148 defined by a semicircle 150 and a diameter 152. A plurality of ridges 154 can be provided about these surfaces bounding the opening 148, as shown, or the ridges 154 may be omitted, if desired.

The opening 148 of the fastener 130 is designed to receive an appropriately shaped mounting member 156, observe FIG. 20A, of a bicycle accessory, herein illustrated as another lock 158. The mounting member 156 preferably is formed as an integral part of the bicycle accessory, which may include a water bottle, a first aid kit, or the like.

Figure 25:
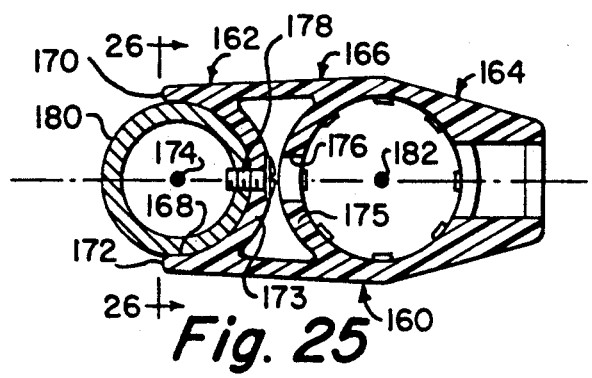
Figure 26:
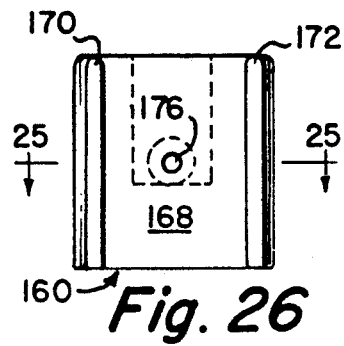
FIG. 26 is a fragmentary elevation along the line 26—26 of FIG. 25, but without also showing the post.

The Embodiment of FIGS. 25-26

In FIGS. 25-26, there is illustrated in horizontal cross section and in vertical elevation respectively, a fastener 160 according to the invention and formed with an integral body of hard, resilient plastic material that includes a pair of opposed retainer portions 162 and 164 and a medial portion 166 therebetween. Retainer portion 162 has an opening 168 defined by a pair of jaws 170, 172 and with inner surfaces also developed by a paraxial locus of linear increments about a first transverse axis 174. It will be noted that, unlike the opening 30 of the fastener 10, the opening 168 is bounded by a semi-circle, and the jaws 170, 172, do not feature any holes to accommodate a bolt. Rather, a hole 176 is provided centrally through both walls 173 and 175 defining the retainer portions 162 and 164 centrally in the medial portion 166, with the hole 176 being horizontally aligned to admit therethrough a mounting screw 178. The screw 178 is used to mount the fastener 160 to a post 180 of a bicycle frame. The opening of the second retainer portion 164 is circular about a second transverse axis 182 and the opening formed within the medial portion 166 is cusped, just like in the fastener 10, observe FIG. 4.

Figures 27, 28:
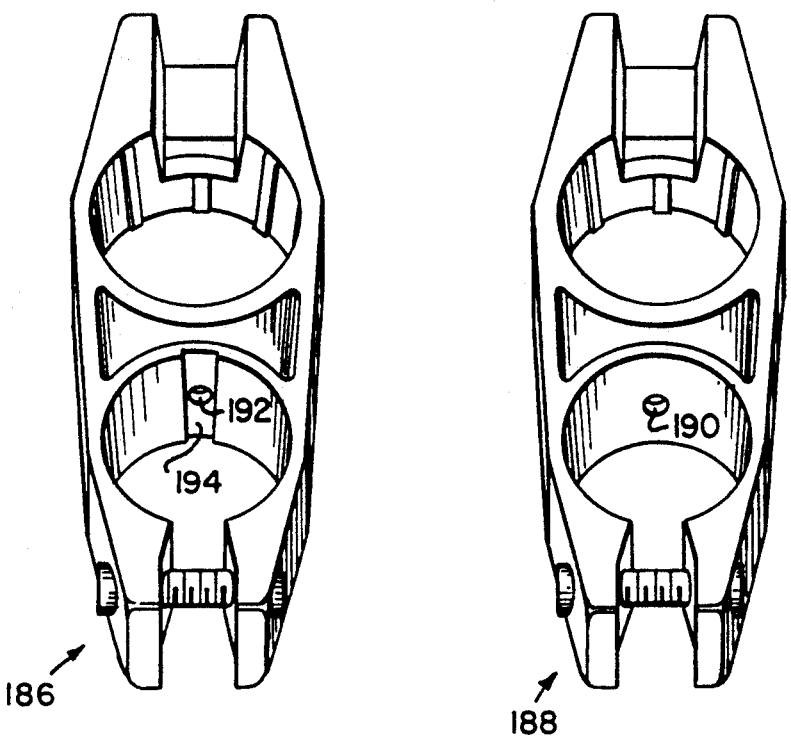
FIGS. 27 and 28 are perspective views of further embodiments of fasteners constructed in accordance with the present invention.

The Embodiments of FIGS. 27-28

The embodiments of fasteners 186 and 188 illustrated in FIGS. 27 and 28 are designed to be mounted over protruding water bottle mounts, not shown, that are provided on upright posts of certain bicycles. Such protruding water bottle mounts are designed to be accommodated either within a hole 190 or a hole 192 formed within a depression 194. In all other respects, both fasteners 186 and 188 are identical with the fastener 10 described above.

Figure 29:
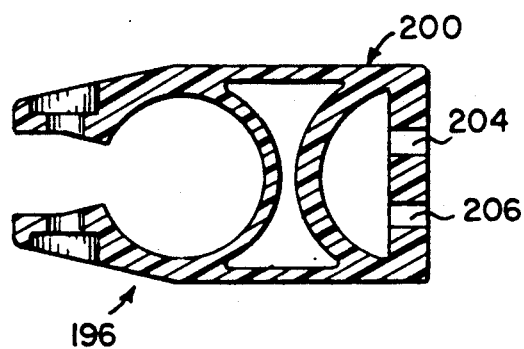
Figure 30:
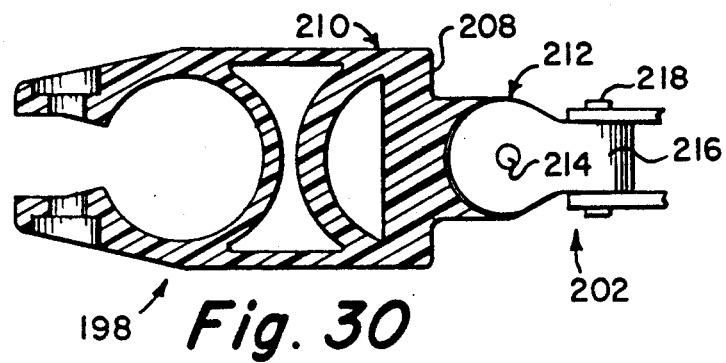

The Embodiments of FIGS. 29-30

The embodiments of fasteners 196 and 198 illustrated respectively in FIGS. 29 and 30 are designed to secure to a post of a bicycle frame another accessory, namely a derailleur 202.

Fastener 196 is similar to the fastener 130 illustrated in FIG. 20. It differs therefrom only with respect to a second retainer portion 200 which is smaller than the retainer portion 134 of the fastener 130, and that it is provided with a pair of mounting holes 204 and 206.

Fastener 198 differs from the fastener 196 only with respect to the specifics of mounting the derailleur 202 thereto. As may be noted, the rear mounting wall 208 of the second retainer portion 210 is thicker and, in lieu of the mounting holes 204, 206, is formed with a mounting bracket 212. Bracket 212 is designed to secure thereto, via a pin 214, a clamp 216. A second pin 218 in turn is designed flexibly to secure thereto the derailleur 202.

The Embodiments of FIGS. 31-33

In FIGS. 31-33 are illustrated three types of blister packages 220, 222 and 224, indicating one type of display of the products of the invention. For example, blister package 220 displays a bicycle lock 226, the fastener 10, and a number of bolts 228. Blister package 222 displays the fastener 10 and the bolts 228, and blister package 224 displays only the bolts 228.

Thus it has been shown and described a number of fasteners for releasably securing a bicycle lock to an upright post of a bicycle frame, which fasteners satisfy the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A fastener for releasably securing a bicycle accessory to a bicycle frame, said fastener comprising:
  (a) an integral body composed of a hard resilient polymer;
  (b) said integral body including a pair of opposed retainer portions and a medial portion therebetween;
  (c) one of said retainer portions having an opening defined by a pair of jaws;
  (d) said opening of said one of said retainer portions being formed with a curved inner surface for snugly receiving part of a bicycle frame;
  (e) said medial portion providing a buffer for mechanically isolating said pair of opposed retainer portions from each other and having an opening;
  (f) the cross sectional configuration of said opening of said medial portion being cusped and defined by a curve which lies along the curve of said curved inner surface.

2. The fastener of claim 1 wherein said opening of said one of said retainer portions defined by said pair of jaws and former with said curved inner surface defines a curved seat which is adaptable for snugly receiving part of a bicycle frame wherein said part is formed with diameters of different sizes.

3. The fastener of claim 2 wherein said pair of jaws are secured to said bicycle part by one of a group consisting of a bent bolt, a straight bolt, a sex bolt, a multisegment breakaway bolt, a three-piece bent bolt, a bolt featuring a chamfer, and a bolt featuring a step and chamfer.

4. The fastener of claim 1 wherein the second of said retainer portions is formed with an opening whose cross sectional configuration is one of a group including: circular, rectangular, oval, crescent-shaped, pentagonal, hexagonal and octogonal.

5. The fastener of claim 1 wherein said pair of retainer portions and said medial portion extend along a longitudinal axis of said integral body, said body formed with a predetermined width and height, whose cross sectional thickness along its said height is greater than along its said width.

6. The fastener of claim 5 wherein said curved inner surface of said opening of said one of said retainer portions and the curved inner surface of one side of said cusped opening of said medial portion are developed by a paraxial locus of linear increments about a first transverse axis, and wherein the curved inner surface of the other side of said cusped opening is developed by a paraxial locus of linear increments about a second transverse axis, said first transverse axis and second transverse axis being parallel to each other and being normal to said longitudinal axis.

7. The fastener of claim 6 wherein said first transverse axis is defined by the axis of said one of said retainer portions and said second transverse axis is defined by the axis of the other of said retainer portions.

8. The fastener of claim 5 wherein said cusped opening of said medial portion is further defined by parallel lines which are paraxial to said longitudinal axis.

9. The fastener of claim 8 wherein said integral body is flexible about said cusped opening along said parallel lines and is rigid about its said height.

10. The fastener of claim 5 wherein said cusped opening of said medial portion is further defined by spaced apart lines which are convergent to said longitudinal axis.

11. The fastener of claim 4 wherein said opening is provided with a plurality of axial ridges beveled at one end thereof.

12. The fastener of claim 1 wherein the second of said retainer portions is designed to receive a mounting member formed integral with a bicycle accessory and shaped to be received in said second retainer portion.

13. The fastener of claim 1 wherein said one of said retainer portions is designed to encircle about half-way said part of said bicycle frame and being secured to said part via a screw extending through said medial portion and said part.

14. The fastener of claim 1 wherein said curved inner surface is provided with a hole to accommodate a water-bottle protrusion therein.

15. The fastener of claim 1 wherein said curved inner surface is provided with a depression and a hole to accommodate a waterbottle protrusion therein.

16. The fastener of claim 1 wherein the second of said retainer portions is designed to secure a derailleur thereto.

17. The fastener of claim 1 being enclosed in a blister package for display and sale.

18. The fastener of claim 1 being enclosed in a blister package for display and sale in conjunction with a bicycle lock.

19. The fastener of claim 1 wherein said medial portion is further provided with a pair of stabilizing extensions.

20. A fastener for releasably securing a bicycle accessory to a bicycle frame, said fastener comprising:
  (a) an integral body composed of a hard resilient polymer;
  (b) said integral body including a pair of opposed retainer portions and a medial portion therebetween;
  (c) said retainer portions and said medial portion extending along a longitudinal axis;
  (d) one of said retainer portions having an opening defined by a pair of jaws with inner surfaces developed by a paraxial locus of linear increments about a first transverse axis;

(e) said medial portion having an opening with inner surfaces developed by a paraxial locus of linear increments about a second transverse axis;

(f) said first transverse axis and said second transverse axis being parallel to each other and being normal to said longitudinal axis;

(g) said paraxial locus of said one of said retainer portions presenting a curved seat for snugly receiving part of a bicycle frame, said curved seat having a curved cross section;

(h) said paraxial locus of the surface of said opening in said medial portion providing a buffer for mechanically isolating the configurations of said pair of opposed retainer portions from each other;

(i) the cross sectional configurations of said opening in said medial portion and said opening of said one of said retainer portions in a plane along said longitudinal axis and normal to said transverse axes being such that said opening of said medial portion is cusped and defined by a curve which lies along the curve of said one of said curved seat.

21. The fastener of claim 20 wherein said curved seat is adaptable for snugly receiving part of a bicycle frame in which said part is formed with diameters of different sizes.

22. The fastener of claim 20 wherein said pair of jaws are secured to said bicycle part by one of a group consisting of a bent bolt, a straight bolt, a sex bolt, a multisegment breakaway bolt, a three-piece bent bolt, a bolt featuring a chamfer, and a bolt featuring a step and chamfer.

23. The fastener of claim 20 wherein the second of said retainer portions is formed with an opening whose cross sectional configuration is one of a group including: circular, rectangular, oval, crescent-shaped. pentagonal, hexagonal and octogonal.

24. The fastener of claim 20 wherein said integral body is formed with a predetermined width and a predetermined height and whose cross sectional thickness along its said height is greater than along its said width.

25. The fastener of claim 20 wherein said first transverse axis is defined by the axis of said one of said retainer portions and said second transverse axis is defined by the axis of the other of said retainer portions.

26. The fastener of claim 20 wherein said cusped opening is further defined by a pair of lines parallel to said longitudinal axis and wherein said integral body is flexible about said cusped opening along said parallel lines and is rigid about its said height.

27. The fastener of claim 20 further including a plurality of projections integral with said body and intruding into the other of said pair of retainer portions and extending the axial length thereof.

28. The fastener of claim 20 wherein the cross sectional thickness of said parallel lines of said cusped opening is less than that of said pair of jaws along said longitudinal axis.

29. The fastener of claim 20 wherein said cusped opening is further defined by a pair of spaced apart lines which are convergent to said longitudinal axis.

30. The fastener of claim 20 wherein said medial portion is further provided with a pair of stabilizing extensions.

* * * * *